Patented Oct. 26, 1937

2,096,742

UNITED STATES PATENT OFFICE 2,096,742

GRADUALLY AVAILABLE FERTILIZER

William J. Hale, Midland, Mich., assignor to The Dow Chemical Company, Midland, Mich., a corporation of Michigan No Drawing. Application February 19, 1934, Serial No. 712,061

13 Claims. (Cl. 71—24)

This invention relates to a gradually available nitrogenous fertilizer.

The present application is a continuation in part of my prior application Serial No. 707,221, filed January 18, 1934.

In the past many suggestions have been made as to methods of supplying nitrogen as a fertilizer constituent. In the early days of the fertilizer industry organic nitrogen largely constituted the nitrogenous addition agent, the chief sources of such organic nitrogen being Peruvian guano, tankage and dried blood. Due to the increased demand as well as to the diversion of some of the older materials, such as blood and tankage to other industries, the fertilizer manufacturer began to rely chiefly on inorganic materials for the nitrogen supply, this as is known giving rise to the Chilean nitrate industry. Since that time by-product and synthetic ammonia have to a considerable degree displaced the Chilean nitrate.

At the present time inorganic forms of nitrogen such for example, as sulphate of ammonia and calcium nitrate are widely employed in formulating mixed fertilizers. Urea, the most concentrated ammoniate available is likewise used to a considerable extent.

While such forms of ammonia compounds are effective, they present the disadvantages of marked solubility. Owing to this high solubility, when applied to the soil they are rapidly leached away with the ground water so that their effect at best is but temporary. By reason of this, it is very difficult to secure what is in fact a balanced fertilizer especially one employing a large amount of the citrate soluble phosphate as the phosphate ingredient for in such a mixture the ammonia units are leached away long before the slowly soluble phosphate is assimilated by the plant.

As described in my prior application, I have found that improved concentrated nitrogenous fertilizers may be produced by carbaminating peat or other similar organic waste material, so as to form urea in situ within the mass. Due to the fact that the urea is impregnated or encased within the cellular or fibrous structure, such a product is more slowly available than prior forms of urea. By "carbaminated" I mean that there are chemically united one or more carbon groups and one or more amino groups, and that the chemically united carbon and amino groups are closely associated with the product in question.

I have now found that a markedly improved fertilizer may be produced by incorporating less soluble derivatives of urea in the cheap and readily available starting materials described in my prior application. The fertilizer product thus produced presents desirable mechanical properties, is substantially non-hygroscopic and is slowly or gradually assimilated by plants.

As indicated above the marked solubility of urea in water permits its removal from carbaminated peat through the natural process of soil leaching. If such leaching is retarded considerably then the fertilizer product may be made to give up its nitrogen gradually as the plants require it.

According to the present invention, this may readily be done by two general methods; either by carbaminating peat or other organic waste to form urea in situ and then converting the urea thus formed to a less soluble derivative, or by carbaminating the organic starting materials under conditions controlled to insure the direct formation of the desired slowly soluble urea derivative.

It will readily be appreciated that with the given concept in view a relatively large number of specifically different compounds may be prepared which will vary in solubility within a rather wide range. These products therefore present an excellent formulating material. Thus the advantages of immediate and protracted assimilation may be secured by mixing predetermined amounts of carbaminated peat containing urea, and carbaminated peat containing a sparingly soluble urea derivative. By the proper formulation, therefore, the nitrogenous constituent of a mixed fertilizer may be made to serve a dual role. This possibility of accurate and safe formulation is of particular importance, for, it is well known in the art that it requires no inconsiderable skill and attention to provide the proper dosage and to adjust the frequency of application of nitrogenous fertilizers if permanent soil improvement is to be attained.

A simple type of compound which fulfills the requirements outlined above and which may readily be incorporated in the ligneous, cellulosic, amylaceous and/or saccharinic carrier is methylene urea.

This compound, having the formula

$$CO:(NH)_2:CH_2,$$

may be made by reacting urea with formaldehyde. Methylene urea may be formed in situ in the improved carrier by reacting formaldehyde with peat or other wastes which have been carbaminated according to the disclosure in my prior application. Preferably the reaction between the aldehyde and urea is carried out in an acid medium such as may be established by phosphoric acid, or by introducing some carbon dioxide along with the aldehyde. Obviously, however, other acidulating agents may be employed. Methylene urea is but sparingly soluble in water and when present in fertilizers possesses a fertilizing value which may extend for several years.

Other aldehydic derivatives of urea may likewise be formed in the carrier. Thus in lieu of formaldehyde, acetaldehyde may be made to react with the urea of the carbaminated waste to convert a large portion of the urea present into monoethylidene urea $CO:(NH)_2:CHCH_3$. This is a crystalline compound melting at 154° C. and is difficultly soluble in water. Slightly above its melting point, at between 160° to 180° C., this compound decomposes into ammonia and melanuric acid. Methylene urea undergoes a similar decomposition but at a somewhat higher temperature.

Similarly, it is within the concept of the invention to produce the relatively insoluble hydroxy-alkylated ureas in situ within the carrier. Thus if methyl alcohol be added to carbaminated peat, or equivalent material, and the mass is heated, both mono, $NH_2CONH(CH_2OH)$ and dimethylol urea $(HOCH_2)NH.CONH(CH_2OH)$ are produced. These have melting points of 110° C. and 126° C. respectively and are each less soluble in water than urea. The dimethylol urea on being heated slightly above its melting point passes over into an amorphous compound which solidifies at approximately 137° C. It analyzes for $C_5H_2O_4N_4$ and is difficultly soluble in water.

It is to be noted that derivatives such as the ureides may be formed when starting with methyl alcohol (rather than the formaldehyde) if the alcohol is fed first through a hot zone in which it is dehydrogenated into formaldehyde which then reacts with the urea as described. Or in lieu of such a two phase treatment the carbaminated peat to be treated may be contained in a vessel which is lined with a copper alloy or other dehydrogenative catalyst. In such circumstances, the alcohol is broken down into formaldehyde at temperatures ranging from 120° C. to 200° C.

$$CH_3OH \rightarrow CH_2:O + H_2$$

As indicated hereinbefore the novel fertilizer material may be produced by first carbaminating the waste starting material and then converting the urea to a more insoluble derivative or the ultimate relatively insoluble urea derivative may be formed directly within the carrier mass. In the latter case it will readily be appreciated that the process may be carried out by, for example, mixing the peat or other waste product with formaldehyde and then carbaminating the mass in the manner described in my prior application that is, by introducing carbon dioxide and ammonia and heating the mass to between 160° C. and 180° C. for a period of two hours more or less. Under these conditions the ureide is formed within and on the cell walls of the peat or equivalent material and is uniformly distributed throughout the mass.

The following examples are illustrative of the efficacy of the treatment as well as the types of materials which may be employed.

Example I

In an iron autoclave of approximately 350 cc. capacity, was placed 100 grams of carbaminated peat analyzing 30% total fixed nitrogen and containing 58.4% urea in situ. The carbaminated peat contained 4.2% of moisture. The autoclave was sealed and there was led into the closed autoclave 30 grams of pure formaldehyde (in aqueous solution and in a current of $CO_2$) and the autoclave brought to a temperature of approximately 100° C. and held there for one hour, after which it was opened and the contents emptied into a container to air dry.

The weight of the product was 109.3 grams of 4.5% moisture content analyzing for 28.6% fixed nitrogen. An estimate of formaldehyde escaping uncombined indicated about 80% formaldehyde had been retained, comprising to a large extent, methylene urea or its decomposition products.

Example II

Into the autoclave described in Example I was admitted 100 grams of carbaminated peat analyzing 30% fixed nitrogen content and containing 58.4% of urea formed in situ in the mass. With the peat was mixed ten percent of its weight of acid magnesium phosphate. The vessel was sealed and 30 grams of pure formaldehyde in a current of carbon dioxide was introduced. The material within the autoclave was heated to about 100° C. and held at this temperature for one hour after which the contents were removed and permitted to air dry. The magnesium phosphate, caused the reaction to proceed smoothly, for practically 90% of the substantially equimolecular quantity of formaldehyde (corresponding to the 58.4 grams of urea in the 100 grams of peat) was absorbed. The weight of the product was 120 grams of 4.5% moisture content analyzing for 26.1% fixed nitrogen.

Example III

Example I was repeated substituting acetaldehyde for formaldehyde. This was made to react with the 100 grams of carbaminated peat of the analysis given in Example I. The material was heated to about 100° C. and held at this temperature for about one hour. Afterwards, the contents were removed and air dried. The resulting product weighed 117.7 grams, of 4.3% moisture content and analyzing for 28.1% fixed nitrogen. An estimate of the acetaldehyde escaping in the effluent cases indicated about 70% of the acetaldehyde employed had entered into reaction with the urea.

Example IV

Example I was again repeated using the same container and the same quantity of carbaminated peat of the analysis given. In place of formaldehyde there was now added two equivalents (64 grams) of methyl alcohol, (based on the 58.4 grams of urea present in the 100 gram sample). The material within the container was heated to between 130° and 150° C. for about one hour. The weight of the product was 114.8 grams. Upon air drying, the material analyzed for 6.4% moisture and 23.27% fixed nitrogen.

Example V

Into an iron autoclave, lined with Monel metal, of approximately 350 cc. capacity, was introduced 100 grams of carbaminated peat of the analysis given. In place of formaldehyde, there was added two equivalents (64 grams) of methyl alcohol (based on the 58.4 grams of urea present in the 100 gram sample), and the contents of the container was raised to between 160° and 200° C. for one hour. Dehydrogenation of the methyl alcohol proceeded to the extent of about 15%, as determined by analysis of formaldehyde liberated on hydrolysis of the end products. Some of the methylol urea compounds were also present but to a large extent an insoluble amorphous material made up the large part of the mass. The product weighted 111.5 grams and after air drying, analyzed for 5.4% of moisture and 25.6% fixed nitrogen.

*Example VI*

Into the autoclave, described in Example I, there were admitted 41 grams of peat analyzing for 1.8% fixed nitrogen and 39% of water, and 25 grams of solid carbon dioxide. There was admixed with the peat 36.4 grams (two equivalents on the basis of $CO_2$) of methyl alcohol. The autoclave was sealed and 58 grams (six equivalents) of liquid ammonia was admitted through an inlet tube. The contents of the autoclave were heated to between 180° and 190° C. and held at this temperature for two hours. After treatment the excess gases were permitted to escape and the material discharged and allowed to air dry. The product weighed 61.2 grams and analyzed to 4.9% of moisture and 24.1% fixed nitrogen.

The products obtained by these treatments were all of granular form showing no tendency to become hygroscopic.

It will readily be understood that the quantities of the reactants and the conditions of the reaction may be so controlled as to obtain any desired amount of conversion of the urea into its more insoluble derivatives. Thus, if desired, the quantity of methyl alcohol, formaldehyde or other reactants used may be less than that required to combine with the total amount of urea present in the carbaminated peat. In these circumstances, the resulting product comprises an organic waste product containing urea and the less soluble urea derivative homogeneously dispersed therethrough. In other words, in the one process, a nitrogenous fertilizer may be made having a plurality of differentially soluble nitrogen values. The marked utility of such product for formulation with other fertilizer values is manifest.

It is particularly to be noted that the products produced according to the present invention have a high fixed nitrogen value, and since the nitrogen content is made slowly available, any danger of overdosage is eliminated.

It will be obvious to those skilled in the art that the present invention is susceptible of a large number of specifically different embodiments, not only in respect of the particular materials produced, but also in respect of the manipulative steps in manufacturing such products. Factory operations, for example, may be carried out in a large commercial autoclave, preferably of the horizontal rotary type in which the material is tumbled or agitated during the treatment so as to insure optimum surface exposure and consequent homogeneity of the product. If desired, such autoclave may be connected with a vacuum pump and be provided with heating coils or a thermal jacket so as to permit of reduced pressure drying as well as recovery of the excess volatile materials.

It is therefore to be understood that the several reactions discussed, and the different products described, are given merely as illustrative of the underlying principles involved and not as specifically defining the limits of the present invention. The invention is considered broadly to reside in the concept of producing a novel type of fertilizer having the improved characteristics of gradual and/or immediate availability and the beneficial concomitants of such characteristics.

I claim:

1. A fertilizer prepared by heating a mixture of an organic carrier and compounds which are potentially reactive to form urea under pressure with an aldehyde to a temperature at which urea and relatively water-insoluble derivatives thereof are formed in situ.

2. A fertilizer prepared by heating a mixture of an organic carrier and compounds which are potentially reactive to form urea under pressure with an alcohol to a temperature at which urea and relatively water-insoluble derivatives thereof are formed in situ.

3. A fertilizer prepared by heating a mixture of peat and compounds which are potentially reactive to form urea under pressure with formaldehyde to a temperature at which urea and relatively water-insoluble derivatives thereof are formed in situ.

4. A fertilizer prepared by heating a mixture of peat and compounds which are potentially reactive to form urea under pressure with acetaldehyde to a temperature at which urea and relatively water-insoluble derivatives thereof are formed in situ.

5. A fertilizer prepared by heating a mixture of peat and compounds which are potentially reactive to form urea under pressure with a lower aliphatic alcohol to a temperature at which urea and relatively water-insoluble derivatives thereof are formed in situ.

6. A fertilizer prepared by heating an organic carrier under pressure with compounds which are potentially reactive to form urea to a temperature at which urea is formed in situ and thereafter reacting urea in the product with an aldehyde to form a relatively water-insoluble urea derivative.

7. A fertilizer prepared by heating an intimate mixture of peat and urea under pressure with an aldehyde to convert the urea at least partially into a relatively water-insoluble urea-aldehyde condensation product.

8. A fertilizer prepared by heating an intimate mixture of peat and urea under pressure with formaldehyde to a temperature at which the urea is at least partially converted into methylene urea by reaction with the formaldehyde.

9. The method of making a nitrogenous fertilizer which comprises heating an intimate mixture of an organic carrier and urea under pressure with an aldehyde to a temperature at which the urea is at least partially converted into a relatively water-insoluble derivative thereof by reaction with the aldehyde.

10. The method of making a nitrogenous fertilizer which comprises heating an intimate mixture of an organic carrier and urea under pressure with an alcohol to a temperature at which the urea is at least partially converted into a relatively water-insoluble derivative thereof by reaction with the alcohol.

11. The method of making a nitrogenous fertilizer which comprises heating peat with compounds which are potentially reactive to form urea under pressure to a temperature at which urea is formed in situ and thereafter heating the resultant mixture under pressure with an aldehyde to a temperature at which the urea is at least partially converted into a relatively water-insoluble derivative thereof by reaction with the aldehyde.

12. A fertilizer prepared by heating a mixture of an organic carrier and compounds which are potentially reactive to form urea under pressure with an aldehyde to a temperature at which urea and relatively water-insoluble derivatives thereof are formed in situ and adding a non-nitrogenous fertilizing agent to the resultant mixture.

13. A fertilizer prepared by heating a mixture of peat and compounds which are potentially reactive to form urea under pressure with formaldehyde to a temperature at which urea and relatively insoluble derivatives thereof are formed in situ and adding a non-nitrogenous fertilizing agent to the resultant mixture.

WILLIAM J. HALE.